(12) United States Patent
Nakadeguchi et al.

(10) Patent No.: US 7,117,584 B2
(45) Date of Patent: Oct. 10, 2006

(54) HEAT EXCHANGER TUBE EXPANDING APPARATUS

(75) Inventors: Shinji Nakadeguchi, Tokyo (JP); Shinji Nakashima, Tokyo (JP); Mitsuru Tanaka, Tokyo (JP); Hiroaki Takada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 337 days.

(21) Appl. No.: 10/780,889

(22) Filed: Feb. 19, 2004

(65) Prior Publication Data

US 2004/0211056 A1 Oct. 28, 2004

(30) Foreign Application Priority Data

Feb. 20, 2003 (JP) ............................. 2003-042925
Jan. 21, 2004 (JP) ............................. 2004-013447

(51) Int. Cl.
 *B23P 15/26* (2006.01)
(52) U.S. Cl. ................. 29/727; 29/726.5; 29/726; 29/890.04; 29/890.044
(58) Field of Classification Search ............ 29/726, 29/727, 890.04, 890.044, 726.5
See application file for complete search history.

(56) References Cited

U.S. PATENT DOCUMENTS

| | | | | | |
|---|---|---|---|---|---|
| 3,688,533 | A | * | 9/1972 | Ames ..................... | 72/20.2 |
| 3,824,668 | A | * | 7/1974 | Wightman ............... | 29/727 |
| 4,204,312 | A | * | 5/1980 | Tooker .................... | 29/523 |
| 4,835,828 | A | * | 6/1989 | York et al. .............. | 29/890.047 |
| 4,839,950 | A | * | 6/1989 | Stroup .................... | 29/890.047 |
| 5,003,691 | A | * | 4/1991 | Milliman et al. ........ | 29/727 |
| 5,029,388 | A | * | 7/1991 | Statile .................... | 29/890.031 |
| 5,210,932 | A | * | 5/1993 | Tokura .................... | 29/727 |
| 5,220,722 | A | * | 6/1993 | Milliman ................. | 29/727 |
| 5,353,496 | A | | 10/1994 | Harman et al. | |
| 5,687,473 | A | * | 11/1997 | Tokura .................... | 29/727 |
| 5,806,173 | A | * | 9/1998 | Honma et al. .......... | 29/727 |
| 6,530,144 | B1 | * | 3/2003 | Hong ...................... | 29/726.5 |

FOREIGN PATENT DOCUMENTS

| | | |
|---|---|---|
| JP | 6-246376 | 9/1994 |
| JP | 6-254644 | 9/1994 |
| JP | 8-90123 | 4/1996 |
| JP | 2003-80330 | 3/2003 |

* cited by examiner

*Primary Examiner*—Marc Jimenez
(74) *Attorney, Agent, or Firm*—Leydig, Voit & Mayer, Ltd.

(57) ABSTRACT

A tube expanding apparatus includes mandrels, each mandrel having a billet on a leading end; a reciprocating actuator for supporting rear ends of the mandrels, the reciprocating actuator being supported to reciprocate in an axial direction of hairpin tube straight portions; a pressure cylinder for raising and lowering the reciprocating actuator and expanding the straight portions by pressing the billets into the hairpin tube straight portions; hairpin receivers for supporting curved portions of hairpin tubes; a fin receiver for supporting a lower end portion of the laminated radiating fins; and a hydraulic cylinder for raising and lowering the fin receiver in the axial direction of the hairpin tube straight portions. The hydraulic cylinder lowers the fin receiver to a predetermined position as the mandrels descend and the billets begin to be inserted into the hairpin tubes.

5 Claims, 11 Drawing Sheets

HEAT EXCHANGER TUBE EXPANDING APPARATUS

BACKGROUND OF THE INVENTION

1. Field of the Invention

The present invention relates to a tube expanding apparatus for a heat exchanger composed of a large number of radiating fins and a plurality of tubes inserted therethrough, for integrally fixing a large number of radiating fins by expanding a tube, and particularly to a heat exchanger tube expanding apparatus improved so as to prevent defects in which a fin collar buckles, placing a radiating fin and a radiating fin overlapping in a direction of lamination in close contact and shutting off an air channel.

2. Description of the Related Art

A tube expanding apparatus for a heat exchanger constituted by a large number of radiating fins and a plurality of tubes inserted through the radiating fins, for integrally fixing a plurality of radiating fins by expanding a tube inserted therethrough, conventionally has a construction such as described below, for example.

A tube expanding apparatus has a reciprocating actuator having a plurality of tube expanding mandrels inserted into a rear surface side, being disposed so as to be raisable and lowerable by means of an expanding and contracting apparatus such as a cylinder, etc. A heat exchanger in which the tubes are to be expanded has a construction in which hairpin tubes having end portions formed into a general U shape are inserted through a plurality of radiating fins, and using this tube expanding apparatus, end portions of the hairpin tubes projecting outward at one end are supported by receivers having a concave portion into which lower end portions can be inserted during tube expansion, enabling the plurality of radiating fins to be integrally fixed by pressing the tube expanding mandrels inserted into the reciprocating actuator of the tube expanding apparatus into the hairpin tubes to expand the hairpin tubes. (See Patent Literature 1, for example.)

Patent Literature 1: Japanese Patent Laid-Open No. HEI 6-254644 (Gazette, Page 2, FIG. 4)

However, in conventional tube expanding apparatuses, if the number of sheets of the radiating fins is increased or if a fin collar shape is modified, changing a relationship between a load acting on the fin collar and the amount of compression, etc., one problem has been that defects may arise in which the fin collar buckles, placing a radiating fin and a radiating fin overlapping in a direction of lamination in close contact and shutting off an air channel.

SUMMARY OF THE INVENTION

The present invention aims to solve the above problems and a first object of the present invention is to provide a tube expanding apparatus in which major deformations of the fin collar, collapse of the radiating fins, etc., do not occur, enabling the provision of a heat exchanger constituted by radiating fins maintained at a uniform distance, and a second object of the present invention is to achieve a tube expanding apparatus in which the rate of occurrence of defects of this kind is reduced inexpensively.

With the above object in view, a tube expanding apparatus of the present invention includes mandrels each having a billet on a leading end; a reciprocating actuator for supporting rear ends of the mandrels, the reciprocating actuator being supported so as to be able to reciprocate in an axial direction of hairpin tube straight portions; and a pressure drive source for raising and lowering this reciprocating plate and expanding the straight portions by pressing the billets into the hairpin tube straight portions. Also, provided are hairpin receivers for supporting curved portions of hairpin tubes; a fin receiver for supporting a lower end portion of a plurality of laminated radiating fins; and a raising and lowering means for raising and lowering the fin receiver in the axial direction of the hairpin tube straight portions. The tube expanding apparatus is characterized in that the raising and lowering means lowers the fin receiver to a predetermined position as the mandrels descend and the billets begin to be inserted into the hairpin tubes.

A tube expanding apparatus having this kind of construction is used in a heat exchanger having a plurality of laminated radiating fins having penetrating apertures on peripheral edge portions of which fin collars are disposed upright and having generally U-shaped hairpin tubes inserted through the penetrating apertures in the direction of lamination of these radiating fins, the tube expanding apparatus integrally securing the plurality of radiating fins by expanding straight portions of the hairpin tubes to place them in pressure contact with the fin collars.

Because the fin receiver descends as the billets begin to descend, the compressive load on the fin collars, which accumulates and increases in the direction of progress of tube expansion, is lightened. Because of this, major deformations of the fin collars, collapse of the radiating fins, etc., do not occur, enabling the provision of a heat exchanger constituted by radiating fins maintained at a uniform distance.

DETAILED DESCRIPTION OF THE PREFERRED EMBODIMENTS

Preferred embodiments of the present invention will now be explained with reference to the drawings.

Embodiment 1

Figure 1:
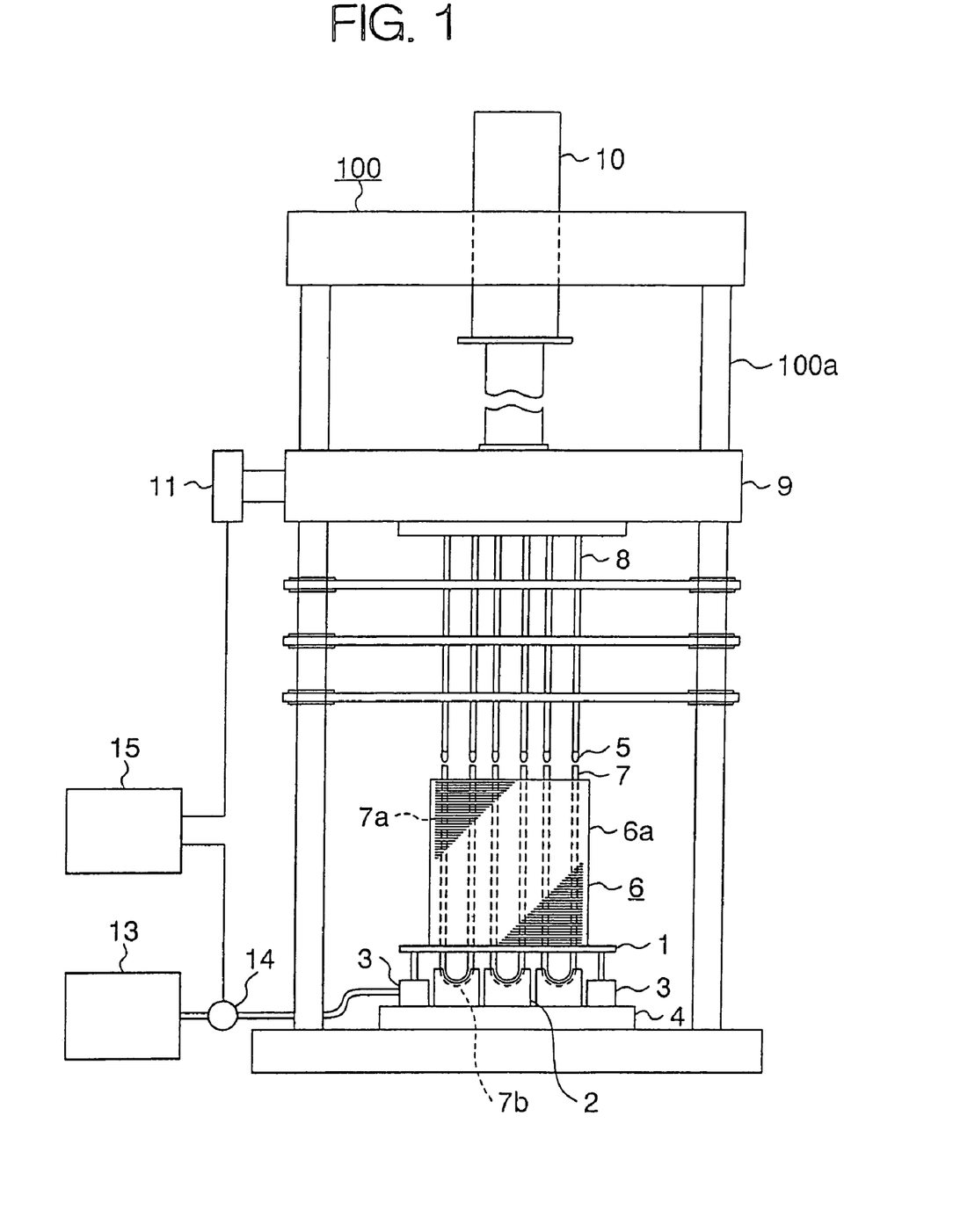
FIG. 1 is a front elevation showing an overall construction of a tube expanding apparatus according to Embodiment 1 of the present invention.

FIG. 1 is a front elevation showing an overall construction of a tube expanding apparatus according to Embodiment 1 of the present invention. In FIG. 1, a heat exchanger 6 is mounted inside a tube expanding apparatus 100. The heat exchanger 6 is used, for example, as a radiating fin-tube heat exchanger in an air conditioner, etc. The heat exchanger 6 is constituted by: a large number of radiating fins 6a laminated in a vertical direction in FIG. 1; and a plurality of hairpin tubes 7 inserted through these radiating fins 6a in the direction of lamination. The hairpin tubes 7 are prepared by being bent into a general U shape, and include: two straight portions 7a extending parallel to each other; and a curved portion 7b linking end portions thereof. The plurality of hairpin tubes 7 are inserted through the laminated radiating fins 6a from a first end, the straight portions 7a passing through the radiating fins 6a and the curved portions 7b projecting outward from the first end. Apertures for passing the hairpin tubes 7 through are formed in major surfaces of the radiating fins 6a, and fin collars 6b having a generally J-shaped cross section are disposed upright on peripheral edge portions of the apertures by a method such as burring, etc. The fin collars 6b function to keep spacing between the radiating fins 6a constant as the radiating fins 6a are being laminated.

The tube expanding apparatus 100 integrally fixes the laminated plurality of radiating fins 6a by expanding the hairpin tubes 7 of the heat exchanger 6. The tube expanding apparatus 100 has: a plurality of tube expanding mandrels 8 that are inserted into the straight portions 7a of the hairpin tubes 7. Each of the mandrels 8 has an elongated rod shape and a billet 5 having an outside diameter equal to that of an inside diameter of the hairpin tubes 7 after tube expansion mounted to a leading end. The rear ends of the mandrels 8 are secured to a reciprocating plate 9 functioning as a reciprocating actuator. The reciprocating plate 9 is supported and guided by a frame body 100a of the tube expanding apparatus 100 so as to be able to move up and down in the direction of lamination of the radiating fins 6a (an axial direction of the straight portions 7a of the hairpin tubes 7). The reciprocating plate 9 is linked to a pressure cylinder 10 functioning as a pressure drive source. The pressure cylinder 10 raises and lowers the reciprocating plate 9, moving the billets 5 up and down and pressing them into the straight portions 7a of the hairpin tubes 7. A position detecting sensor 11 for detecting the position of the pressure cylinder 10 in the direction of motion is disposed on a side portion of the tube expanding apparatus 100. The position detecting sensor 11 is electrically connected to a control apparatus 15, output signals from the position detecting sensor 11 being transmitted to the control apparatus 15.

A fin receiver 1 and hairpin receivers 2 are disposed in a lower portion of the tube expanding apparatus 100. The heat exchanger G is mounted on this fin receiver 1 and the hairpin receivers 2. The hairpin receivers 2 have U-shaped grooves that fit together with the curved portions 7b of U-shaped hairpin tubes 7, supporting only the hairpin tubes 7. On the other hand, the fin receiver 1 has penetrating apertures through which the hairpin tubes 7 pass bored through a major surface, and supports the load of the laminated radiating fins 6a in a gravitational direction.

First and second end portions of the fin receiver 1 are each supported by a hydraulic cylinder 3. The hairpin receivers 2 and the hydraulic cylinders 3 are secured on a receiver platform 4. A hydraulic drive source 13 for supplying hydraulic pressure is connected to the hydraulic cylinders 3. A flow adjusting valve 14 for adjusting an amount of oil supplied to the hydraulic cylinders 3 is disposed between the hydraulic cylinders 3 and the hydraulic drive source 13. The flow adjusting valve 14 is electrically connected to the control apparatus 15. The control apparatus 15 adjusts the degree of opening of the flow adjusting valve 14 based on the output signals from the position detecting sensor 11 described above.

Next, a tube expanding operation of the tube expanding apparatus 100 constructed in this manner will be explained.

First, a heat exchanger 6 is set in the tube expanding apparatus 100 by mounting the large number of laminated radiating fins 6a on the fin receiver 1 and fitting the curved portions 7b into the hairpin receivers 2.

Next, the pressure cylinder 10 is activated, the billets 5 are inserted into upper end portions of the hairpin tubes 7 as the reciprocating plate 9 descends, and tube expansion is started. As the billets 5 descend further and reach the group of radiating fins 6a, the hydraulic drive source 13 reduces the pressure inside the hydraulic cylinders 3 to lower the fin receiver 1. The billets 5 are inserted through the upper end portions of the hairpin tubes 7 and flare the inside diameters of the straight portions 7a as they descend, placing the laminated fin collars 6b and the hairpin tubes 7 in close contact. The lowering of the fin receiver 1 is completed before the billets 5 descend to a tube expansion end point in a vicinity of the curved portions 7b of the hairpin tubes 7. The billets 5 stop at the tube expansion end point immediately before reaching the curved portions 7b of the hairpin tubes 7, then rise to complete the tube expanding operation. After completing tube expansion, the reciprocating plate 9 rises, removing the mandrels 8 and the billets 5 from the hairpin tubes 7, and the fin receiver 1 is simultaneously restored to its initial position.

Figures 2A, 2B:
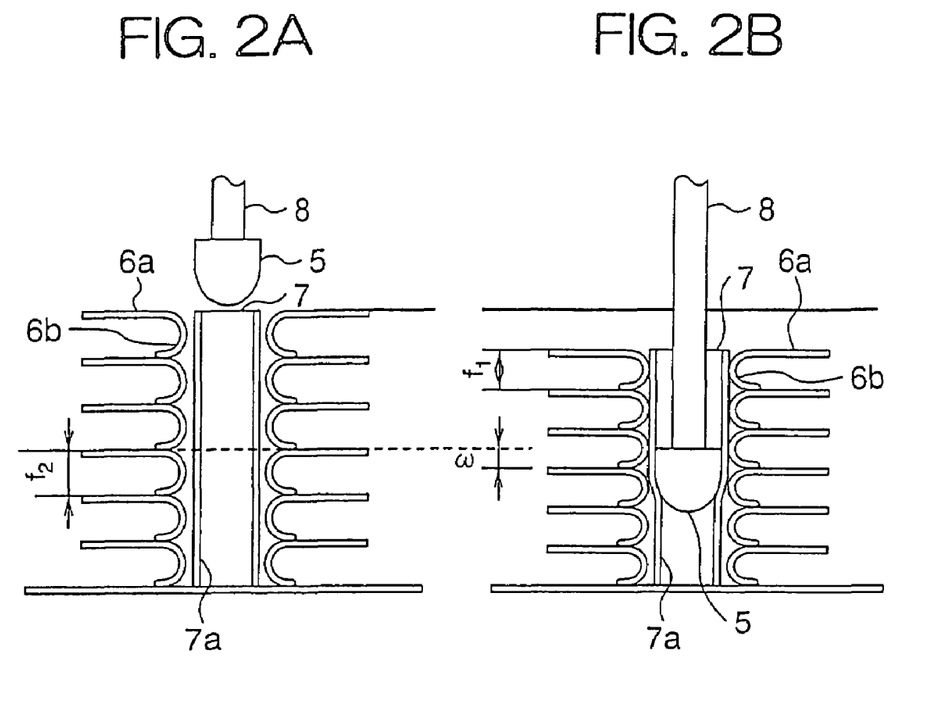
FIG. 2A is a cross section schematically showing deformation behavior of fin collars in a tube expanding operation.
FIG. 2B is another cross section schematically showing deformation behavior of the fin collars in the tube expanding operation.

Next, a defect in which adjacent radiating fins 6a buckle and shut off an air channel will be explained. FIGS. 2A and 2B are cross section schematically showing deformation behavior of the fin collars 6b in the tube expanding operation, FIG. 2A showing a state before tube expansion and FIG. 2B showing a state during tube expansion. When tube expansion is started, outer circumferential surfaces of the straight portions 7a of the hairpin tubes 7 flare the inner circumferential surface of the fin collars 6b radially outward, and the fin collars 6b are deformed so as to elongate in the direction of lamination. The hairpin tubes 7 simultaneously contract in an axial direction. The fin collars 6b not yet subjected to tube expansion are compressed by the elongated fin collars 6b and the contracted hairpin tubes 7 and are compacted.

Now, it has been found from experiments by the present applicants that if we let $f_2$ be a pitch in the direction of lamination (radiating fin pitch) of the radiating fins 6a before tube expansion, $N_2$ be the number of radiating fins 6a, $f_1$ be the radiating fin pitch where tube expansion has been completed, $N_1$ be the number of those fins, $\epsilon$ be the amount of compression in the fin collars 6b not yet subjected to tube expansion, $\alpha_i$ be the elongation percentage of the fin collars 6b arising due to tube expansion, $\alpha_0$ be the elongation percentage due to tube expansion at no-load, $\beta$ be the contraction percentage of the tubes, and $\eta_i$ be a distance compressed by the load of the ith radiating fin 6a subjected to tube expansion, then the amount of compression of the fin collars 6b not yet subjected to tube expansion at the position of the billet partway through tube expansion is given by the following Expression 1:

$$\eta_{i=N_1+1} = \frac{\epsilon}{N_2} = \frac{1}{N_2}\sum_{i=1}^{N_1}\{(\alpha_i - 1) + \alpha_i \cdot \beta)\}f_2 \qquad [\text{Expression 1}]$$

Figure 3:
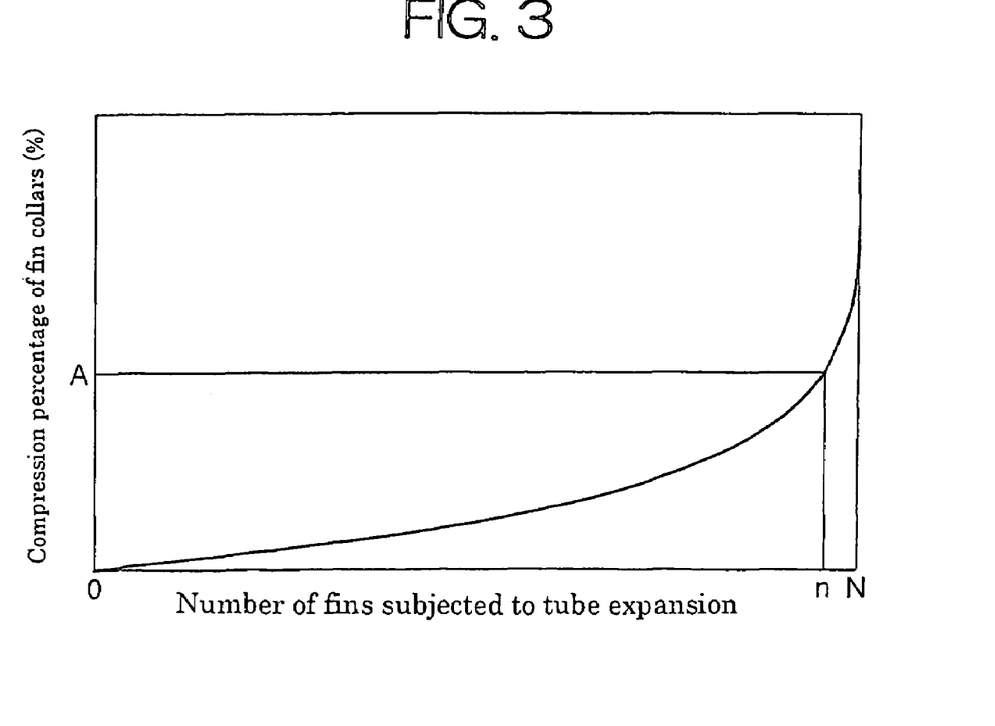
FIG. 3 is a relational diagram showing a relationship between the number of radiating fins subjected to tube expansion and a compression percentage in fin collars not yet subjected to tube expansion.

A relationship between the number of radiating fins 6a subjected to tube expansion and the compression percentage of the fin collars 6b not yet subjected to tube expansion based on the above expression 1 is shown in FIG. 3. In other words, as tube expansion progresses, the amount of compression of the fin collars 6b accumulates, reducing the radiating fin pitch in lower parts of the heat exchanger 6.

Figure 4:
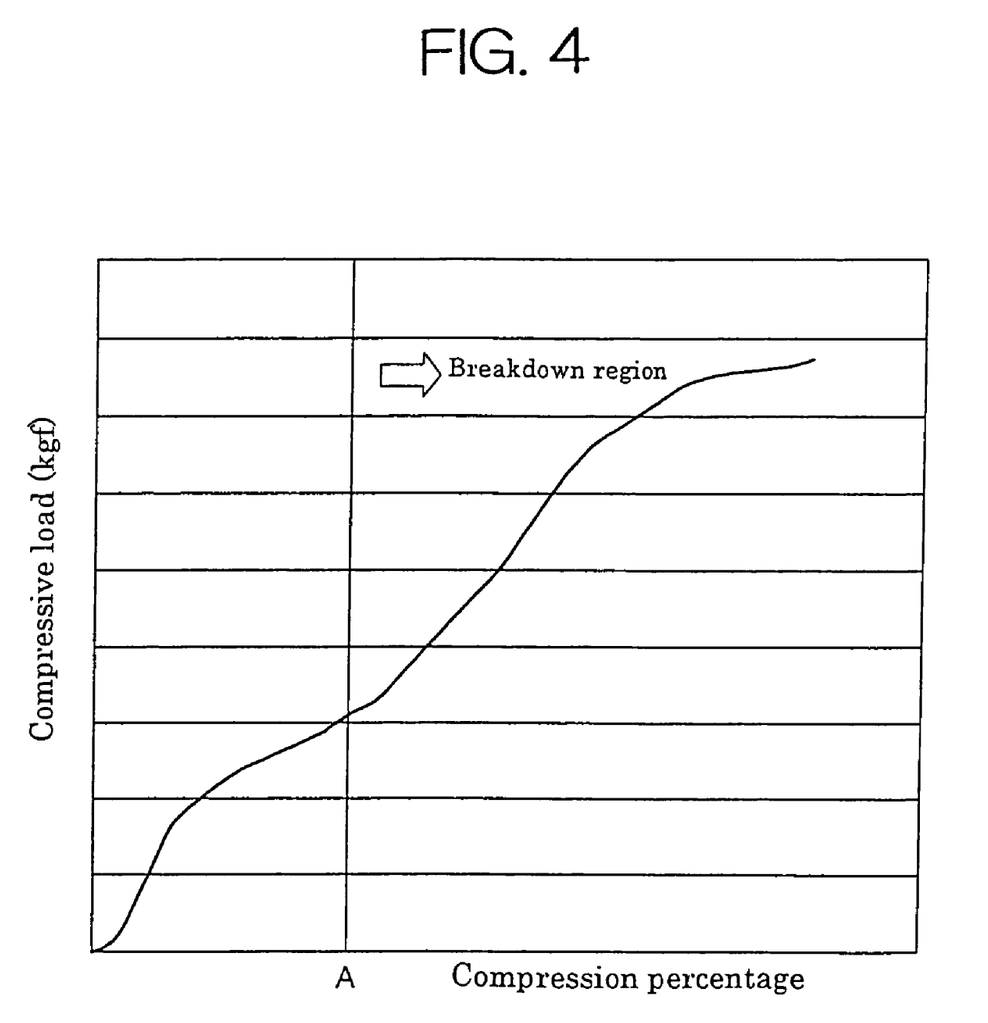
FIG. 4 is a relational diagram showing a relationship between load on the fin collars and the compression percentage found experimentally by subjecting a fin collar to a compressive load.

Next, a relationship between load on the fin collars 6b and compression percentage found experimentally by subjecting a single fin collar 6b to a compressive load is shown in FIG. 4. From FIG. 4, it can be seen that when the fin collar 6b is compressed by A percent (A %) from its original length, it buckles and collapses. The compression percentage (A percent (A %)) at which the fin collar 6b buckled was ten to thirty percent (10% to 30%).

From the relationship between the number of radiating fins 6a subjected to tube expansion and the compression percentage of the fin collars 6b shown in FIG. 3, buckling of the fin collars 6b arises when the number n subjected to tube expansion is such that the compression percentage of the fin collars is A percent (A %). Thus, the fin collars 6b undergo major deformation when the amount of compression of the fin collars 6b exceeds a predetermined amount of compression (or when a buckling load of the fin collars is exceeded). As a result, the fin collars 6b buckle, leading to defects such as air channels being shut off. At this time, if the amount of compression of the fin collars 6b is large, the deformation of the fin collars 6b carries over to the radiating fins 6a, placing adjacent radiating fins 6a in close contact with each other. Because of this, in reality, defects occur in the heat exchanger 6 with a number of fins that is fewer than n.

Figure 5:
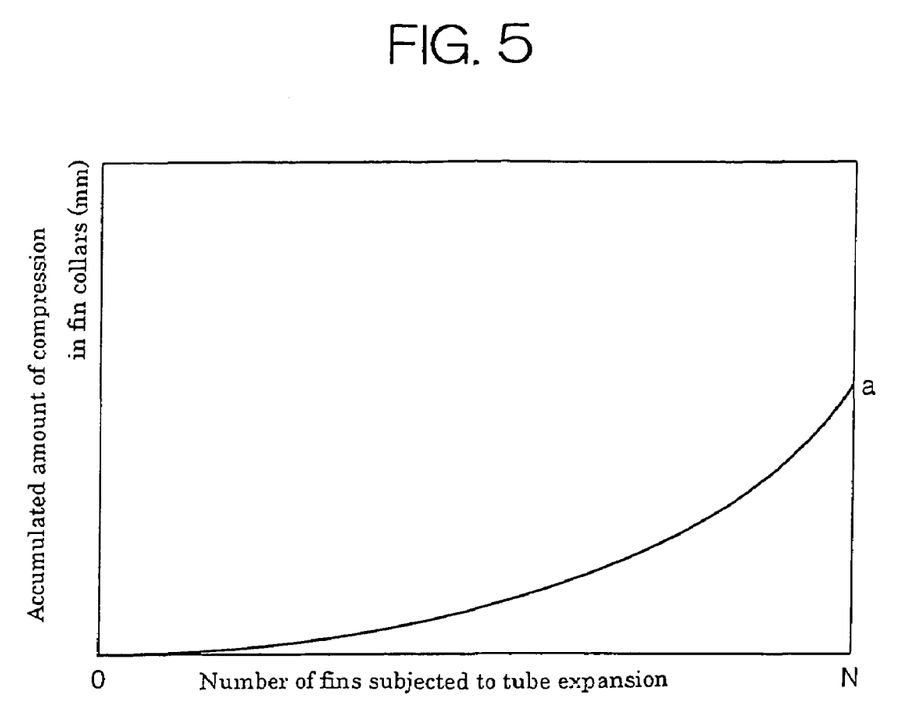
FIG. 5 is a relational diagram showing an accumulated amount of compression in the fin collars when the number of fins subjected to tube expansion is N.
Figure 6:
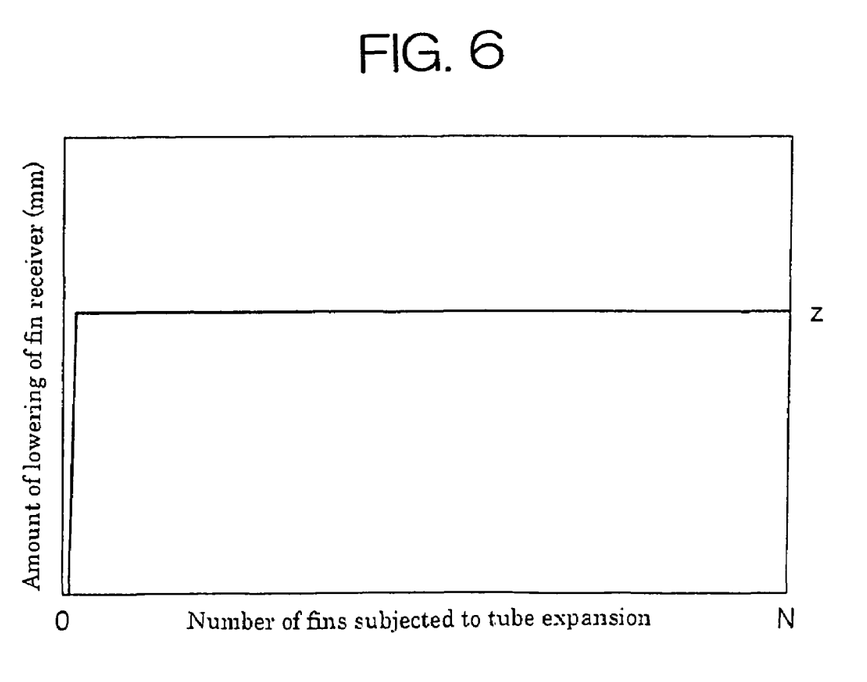
FIG. 6 is a diagram showing a lowering mode of a fin receiver in the tube expanding apparatus according to Embodiment 1 of the present invention.

Now, the accumulated amount of compression in the fin collars 6b as the number of fins subjected to tube expansion is N increases as shown in FIG. 5, for example. When tube expansion proceeds to the last (Nth) fin, the accumulated amount of compression in the fin collars 6b is a. In Embodiment 1, as shown in FIG. 6, a lowering mode of the fin receiver 1 is set such that the fin receiver 1 descends swiftly at the start of tube expansion to an amount of lowering z and is thereafter maintained at the amount of lowering z. In FIG. 6, the vertical axis represents the amount of lowering of the fin receiver 1, and the horizontal axis represents the number of radiating fins 6a subjected to tube expansion. The solid line in the figure represents the amount of lowering of the fin receiver 1 as tube expansion proceeds. Moreover, the amount of lowering z of the fin receiver 1 is set so as to be greater than the accumulated amount of compression a in the fin collars 6b.

By setting the amount of lowering z of the fin receiver 1 so as to be greater than the accumulated amount of compression a in the fin collars 6b in this manner, the compressive load applied to the fin collars 6b is released, enabling the compressive load on the fin collars 6b, which accumulates and increases in the direction of progress of tube expansion, to be lightened. By setting the amount of lowering z in this manner, the fin collars 6b are not compressed excessively from the commencement to the completion of tube expansion, that is, the compression percentage of the fin collars 6b does not exceed A percent (A %) (ten to thirty percent (10% to 30%)), thereby enabling defects such as destruction of the fin collars 6b or collapse of the radiating fins 6a, etc., to be reduced.

A tube expanding apparatus having this kind of construction is used in a heat exchanger 6 having a plurality of laminated radiating fins 6a having penetrating apertures on peripheral edge portions of which fin collars 6b are disposed upright and having generally U-shaped hairpin tubes 7 inserted through the penetrating apertures in the direction of lamination of these radiating fins 6a, the tube expanding apparatus integrally securing the plurality of radiating fins 6a by expanding straight portions 7a of the hairpin tubes 7 to place them in pressure contact with the fin collars 6b, the tube expanding apparatus including: mandrels 8 each having a billet 5 on a leading end; a reciprocating plate 9 functioning as a reciprocating actuator for supporting rear ends of the mandrels 8, the reciprocating plate 9 being supported so as to be able to reciprocate in an axial direction of the hairpin tube straight portions 7a; a pressure cylinder 10 functioning as a pressure drive source for raising and lowering this reciprocating plate 9 and expanding the straight portions 7a by pressing the billets 5 into the hairpin tube straight portions 7a; hairpin receivers 2 for supporting curved portions 7b of the hairpin tubes 7; a fin receiver 1 for supporting a lower end portion of the plurality of laminated radiating fins 6a; and hydraulic cylinders 3 functioning as a raising and lowering means for raising and lowering the fin receiver 1 in the axial direction of the hairpin tube straight portions 7a, the hydraulic cylinders 3 lowering the fin receiver 1 to a predetermined position as the mandrels 8 descend and the billets 5 begin to be inserted into the hairpin tubes 7. Because the fin receiver 1 descends as the billets 5 begin to descend, the compressive load on the fin collars 6b, which accumulates and increases in the direction of progress of tube expansion, is lightened. Because of this, major deformations of the fin collars 6b, collapse of the radiating fins 6a, etc., do not occur, enabling the provision of a heat exchanger 6 constituted by radiating fins 6a maintained at a uniform distance.

Because the raising and lowering means is constituted by hydraulic cylinders 3 disposed between the fin receiver 1 and the receiver platform 4, the descent of the fin receiver 1 can be reliably controlled, enabling major deformation of the fin collars 6b and collapse of the radiating fins 6a to be prevented more reliably, improving reliability.

Figure 7:
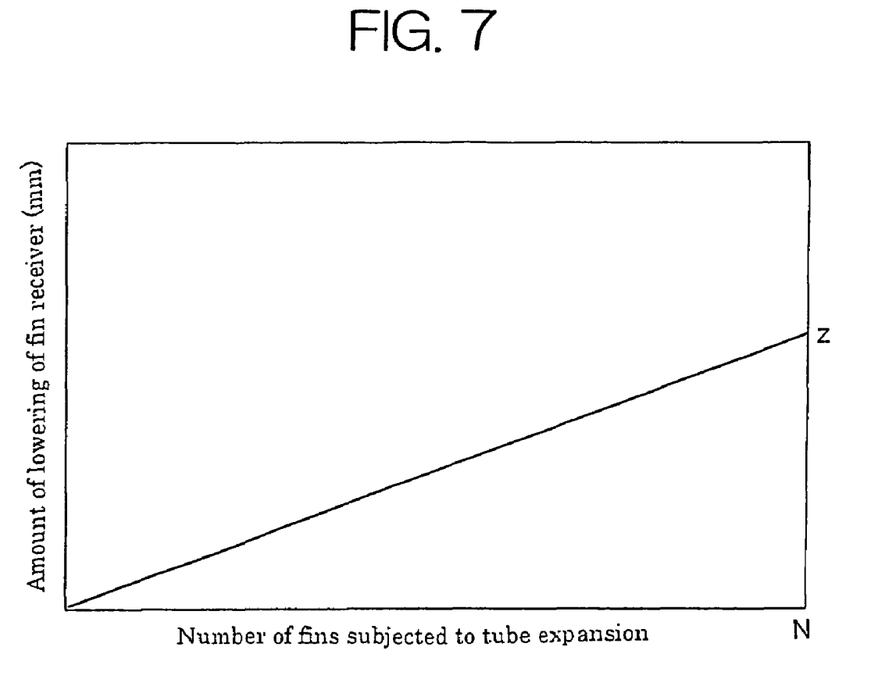
FIG. 7 is a diagram showing another embodiment of the lowering mode of the fin receiver in the tube expanding apparatus according to Embodiment 1 of the present invention.

Moreover, in Embodiment 1 above, the lowering mode of the fin receiver 1 is set such that the fin receiver 1 descends swiftly from the start of tube expansion to an amount of lowering z and is thereafter maintained at the amount of lowering z, but as shown in FIG. 7, the lowering mode of the fin receiver 1 may also be set such that the fin receiver 1 descends at a constant speed from the commencement of tube expansion so as to be at the amount of lowering z at the point in time when the number of fins subjected to tube expansion is N. In that case, the amount of lowering z of the fin receiver 1 when the number of fins subjected to tube expansion is N is also greater than the accumulated amount of compression a in the fin collars, and the amount of lowering of the fin receiver 1 for each number of fins subjected to tube expansion is also greater than the accumulated amount of compression in the fin collars for each number of fins subjected to tube expansion. Thus, the compressive load applied to the fin collars 6b is released, and the compression percentage of the fin collars 6b does not exceed A percent (A%) (ten to thirty percent (10% to 30%)), enabling similar effects to those of Embodiment 1 above to be achieved.

Embodiment 2

Figure 8:
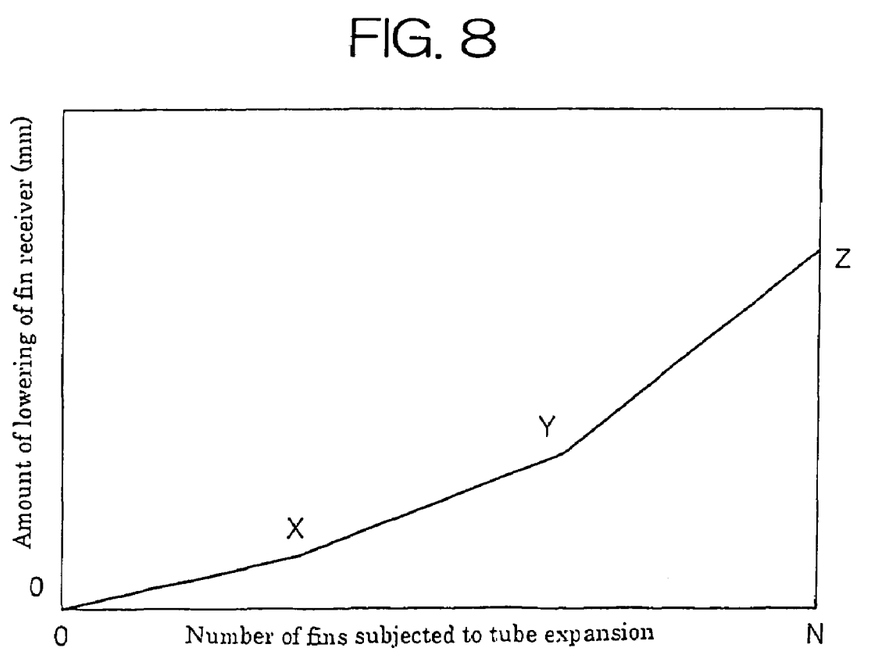
FIG. 8 is a diagram showing a lowering mode of a fin receiver in a tube expanding apparatus according to Embodiment 2 of the present invention.

FIG. 8 is a relational diagram showing a method for lowering a fin receiver 1 according to Embodiment 2 of the present invention. The vertical axis represents the amount of lowering of the fin receiver 1, and the horizontal axis represents the number of radiating fins 6a subjected to tube expansion. The solid line in the figure represents the amount of lowering of the fin receiver 1 as tube expansion proceeds.

In Embodiment 2, as shown in FIG. 8, the fin receiver 1 descends at a constant speed until point X, being an initial phase of tube expansion, and descends at a speed greater than that of the initial phase to point Y, being an intermediate phase of tube expansion. Then, in a later phase of the tube expansion progression, since there is a tendency for the incremental ratio of the accumulated amount of compression to increase compared to the initial phase, the fin receiver 1 descends with the speed increased further from point Y to point Z. In a lowering mode of the fin receiver 1 set in this manner, the amount of lowering of the fin receiver 1 for each number of fins subjected to tube expansion is greater than the accumulated amount of compression in the fin collars for each number of fins subjected to tube expansion shown in FIG. 5.

In Embodiment 2, the tube expanding operation is performed by driving the hydraulic drive source 13. The control apparatus 15 controls the degree of opening of the flow adjusting valve 14 based on a lowering mode for the fin receiver 1 preset as shown in FIG. 8 and the output signals from the position detecting sensor 11. After completing tube expansion, the reciprocating plate 9 is raised, removing the mandrels 8 and the billets 5 from the hairpin tubes 7, and the fin receiver 1 is simultaneously restored to its initial position. Moreover, in the present embodiment, hydraulic cylinders 3 are used as the raising and lowering means for the fin receiver 1, but pneumatic cylinders or servomotors may also be used.

Thus, in Embodiment 2, because the fin receiver 1 is lowered in response to the amount of compression in the fin collars 6b accumulated with the progression of tube expansion, problems such as the radiating fins 6a slipping down during tube expansion and catching on the hairpin tubes 7 can be reduced.

Figure 9:
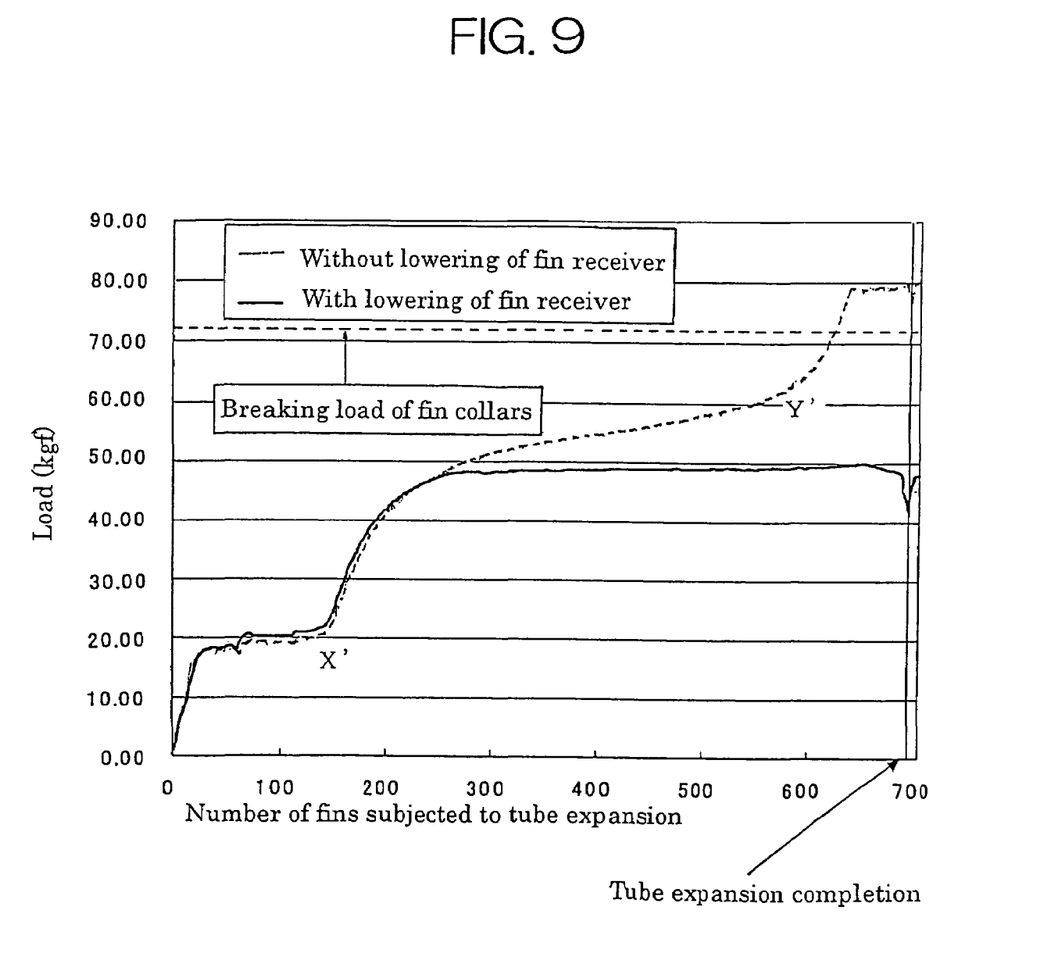
FIG. 9 is a graph showing a relationship between the number of fins subjected to tube expansion and load acting on the fin receiver in the tube expanding apparatus according to Embodiment 2 of the present invention.

The method for setting the lowering mode of the fin receiver 1 in Embodiment 2 will now be explained with reference to FIG. 9. FIG. 9 is a graph showing results when a load indicator was installed on the fin receiver 1 in a tube expanding apparatus 100 and the load applied to the fins relative to the descent distance of the billets was measured. Moreover, in FIG. 9, a heat exchanger constructed by laminating at a fin pitch of 0.3 mm radiating fins on which fin collars were disposed in a 2 by 12 (24 aperture) matrix pattern using copper tubes having an outside diameter of 7.2 mm and a wall thickness of 0.3 mm for the hairpin tubes was disposed in the tube expanding apparatus 100, and tube expansion was performed on the copper tubes. In FIG. 9, the solid line represents an inventive example of the present invention in which the fin receiver 1 was lowered based on the lowering mode shown in FIG. 8, and the broken line represents a comparative example in which the fin receiver 1 was not lowered. Furthermore, since the breaking load of each of the fin collars was 3 kgf, the total breaking load of the fin collars in each of the radiating fins was 72 kgf (=3 kgf×24).

In the comparative example, the load acting on the fin receiver 1 assumed a mode which rises suddenly from the commencement of tube expansion, becomes constant at approximately 20 kgf when the number of fins subjected to tube expansion was in an order of approximately 20 to 150, rises suddenly when the number of fins subjected to tube expansion passes approximately 150 (point X'), rises gently when the number of fins subjected to tube expansion is between approximately 250 and approximately 570, and finally rises suddenly when the number of fins subjected to tube expansion passes approximately 570 (point Y'). When the number of fins subjected to tube expansion passed approximately 600, the load acting on the fin receiver 1 exceeded the 72 kgf breaking load of the fin collars.

In the inventive example of the present invention, in contrast to the comparative example, results were obtained that showed that the load acting on the fin receiver 1 stabilizes at approximately 50 kgf in a region in which the number of fins subjected to tube expansion is greater than or equal to approximately 250. In this inventive example, point X and point Y of the lowering mode of the fin receiver 1 shown in FIG. 8 were made to match with point X' and point Y' in FIG. 9.

From this, it can be seen that the sudden increase in the load in the vicinity of point X' in FIG. 9 in the comparative example can be alleviated by increasing the amount of lowering of the fin receiver 1. It can also be seen that the sudden increase in load in the vicinity of point Y' in FIG. 9 can be alleviated by increasing the amount of lowering of the fin receiver 1 so as not to exceed the breaking load of the fin collars.

Thus, according to Embodiment 2, even if the number of fins subjected to tube expansion is increased, major deformations of the fin collars, collapse of the radiating fins, etc., do not occur, and effects can be achieved enabling a heat exchanger constituted by radiating fins maintained at a uniform distance to be manufactured inexpensively with a high yield. Significant effects can be achieved in particular, if Embodiment 2 is applied to tube expansion in a heat exchanger in which the number of fins subjected to tube expansion exceeds 200.

Consequently, the relationship between the number of fins subjected to tube expansion and the load acting on the fin receiver 1 in the tube expanding operation of the heat exchanger should be measured in advance without lowering the fin receiver 1, and a lowering mode should be set that lowers the fin receiver 1 when the number of fins subjected to tube expansion reaches a point where the load acting on the fin receiver 1 rises suddenly. Here, it is desirable for the amount of lowering of the fin receiver 1 to be set such that the load acting on the fin receiver 1 is sixty to ninety percent (60% to 90%) of the breaking load of the fin collars. Specifically, if the load acting on the fin receiver 1 exceeds ninety percent (90%) of the breaking load of the fin collars, there is a possibility that buckling of the fin collars 6b may occur, and if the load acting on the fin receiver 1 is less than sixty percent (60%) of the breaking load of the fin collars 6b, the amount of deformation in the fin collars 6b is small, preventing sufficient bond strength between the radiating fins 6a and the hairpin tubes 7 from being achieved.

If the fin receiver 1 is lowered by this lowering mode for a fin receiver 1, the compression percentage of the fin collars 6b will not exceed A percent (A %) (ten to thirty percent (10% to 30%)), also enabling the occurrence of buckling of the fin collars 6b to be prevented.

Figure 10:
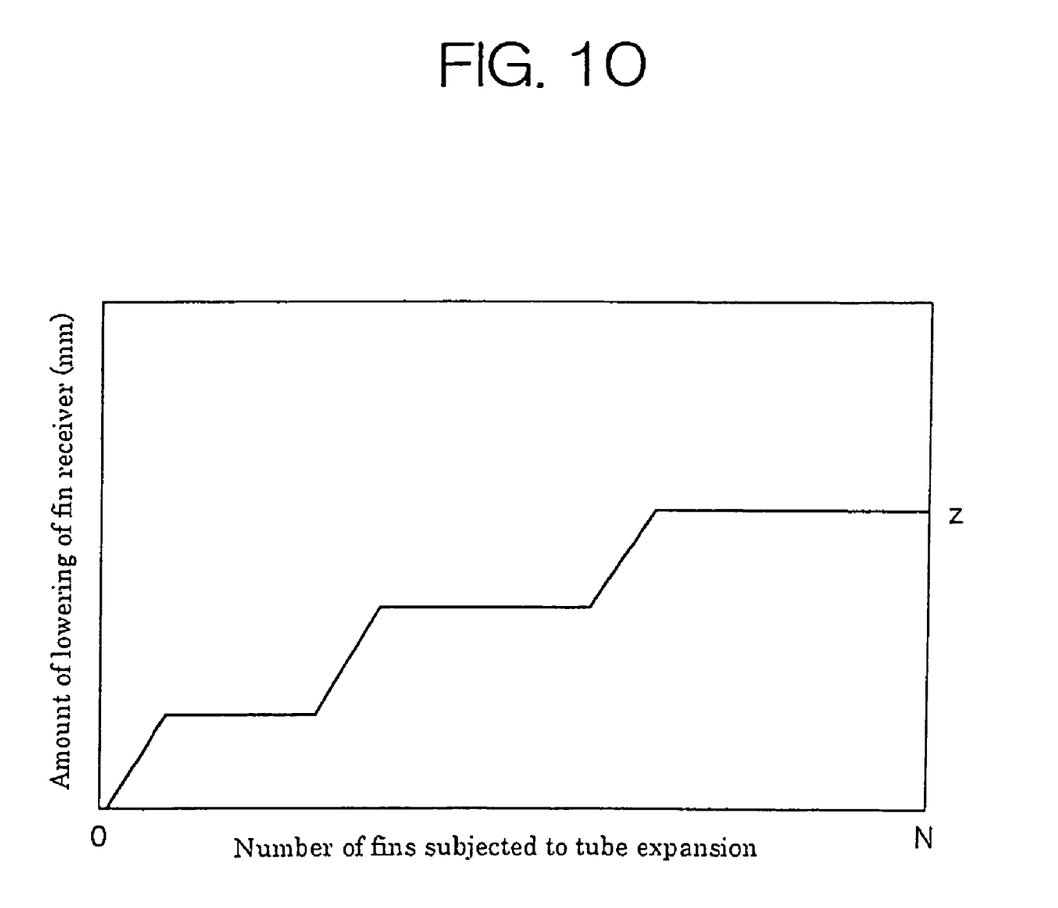
FIG. 10 is a diagram showing another embodiment of the lowering mode of the fin receiver in the tube expanding apparatus according to Embodiment 2 of the present invention.

Moreover, in Embodiment 2 above, the lowering mode of the fin receiver 1 is set such that the fin receiver 1 descends at a constant speed until point X (the initial phase of tube expansion), and descends at a speed greater than that of the initial phase from point X to point Y (the intermediate phase of tube expansion), then descends with the speed increased further from point Y to point Z (the later phase of the tube expansion progression), but as shown in FIG. 10, a step-shaped lowering mode for the fin receiver 1 adopting the amount of lowering in three stages including the initial phase of tube expansion, the intermediate phase of tube expansion, and the later phase of the tube expansion progression may also be set. In that case, because sudden increases in load in the tube expanding operation are also alleviated by the descent of the fin receiver 1, and the amount of lowering of the fin receiver 1 for each number of fins subjected to tube expansion is also greater than the accumulated amount of compression in the fin collars for each number of fins subjected to tube expansion, similar effects to those in Embodiment 2 above can also be achieved.

In Embodiment 2 above, the lowering speed of the fin receiver 1 is changed in three stages, but the lowering speed of the fin receiver 1 may also be changed in four stages or more. In that case, the lowering mode of the fin receiver 1 follows the curve of changes in the accumulated amount of compression in the fin collars 6b relative to the number of fins subjected to tube expansion shown in FIG. 5. Thus, the amount of lowering of the fin receiver 1 does not become excessively larger than the accumulated amount of compression of the fin collars 6b, enabling problems such as the radiating fins 6a slipping down during tube expansion and catching on the hairpin tubes 7 to be reliably avoided.

Embodiment 3

Figure 11:
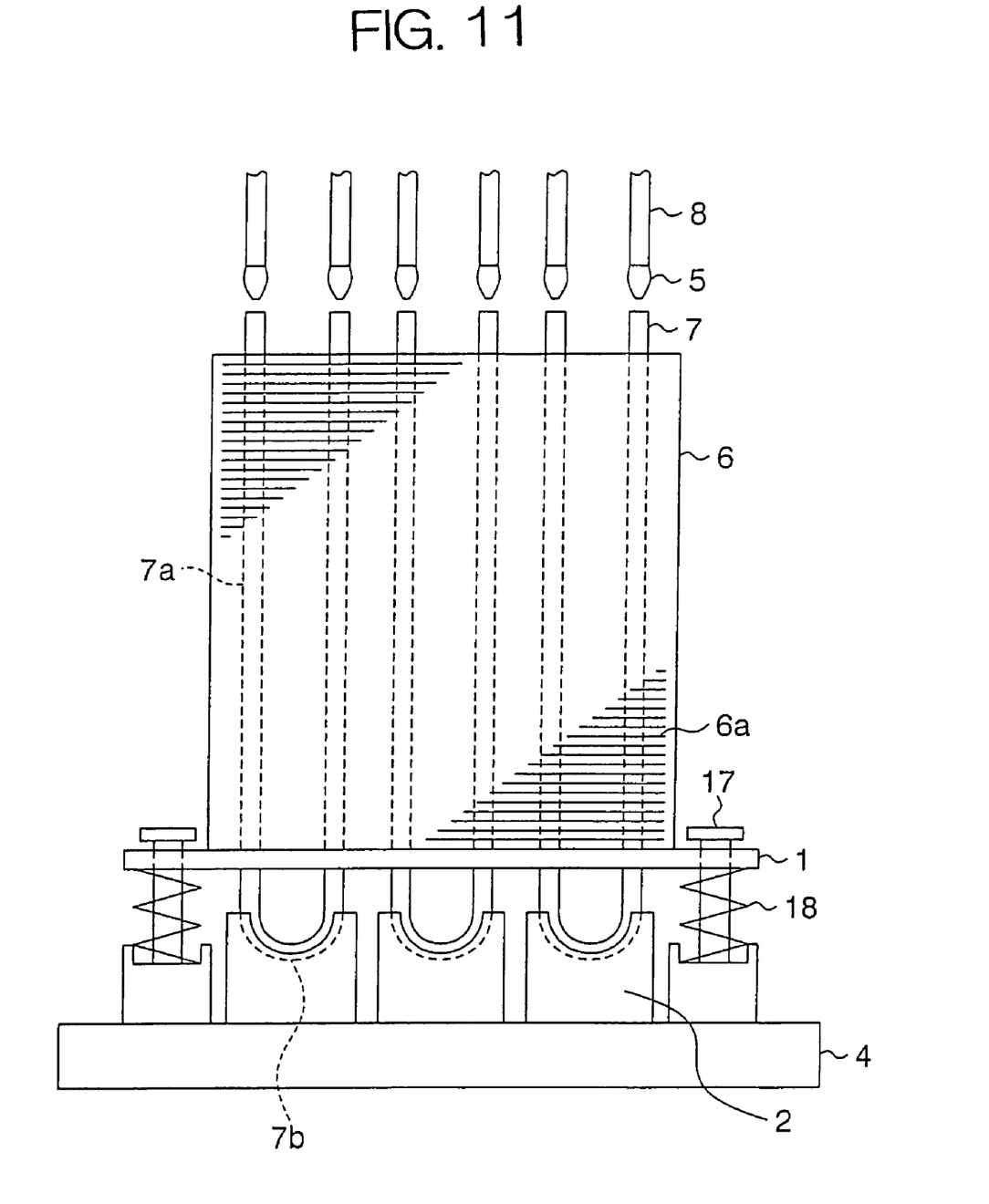
FIG. 11 is a front elevation showing part of a construction of a tube expanding apparatus according to Embodiment 3 of the present invention.

FIG. 11 is a front elevation showing part of a construction of a tube expanding apparatus according to Embodiment 3 of the present invention. In this embodiment, first and second end portions of a fin receiver 1 are supported by elastic bodies through which guide posts 17 pass. Coil springs 18 disposed in a compressed state, for example, are used as the elastic bodies. Billets 5 are inserted into upper end portions of hairpin tubes 7 as mandrels 8 are lowered, and tube expansion is started. As the billets 5 descend further and reach a group of radiating fins 6a, a compressive load begins to accumulate in the fin collars 6b not yet subjected to tube expansion. Because the compressive load propagates from the fin receiver 1 to the coil springs 18 and is used as a force to compress the coil springs 18 along the guide posts 17, the compressive load accumulating in the fin collars 6b not yet subjected to tube expansion is lightened. After completing tube expansion, when the mandrels 8 are raised, removing the billets 5 from the hairpin tubes 7, the compressive load on the elastic bodies 18 is released and the fin receiver 1 rises and is restored to its initial position.

In a tube expanding apparatus having this kind of construction, because the raising and lowering means is constituted by coil springs 18 functioning as elastic bodies disposed between the fin receiver 1 and a receiver platform 4, the construction of the raising and lowering means for the fin receiver 1 can be simplified, enabling it to be used as inexpensive equipment.

Embodiment 4

Figure 12:
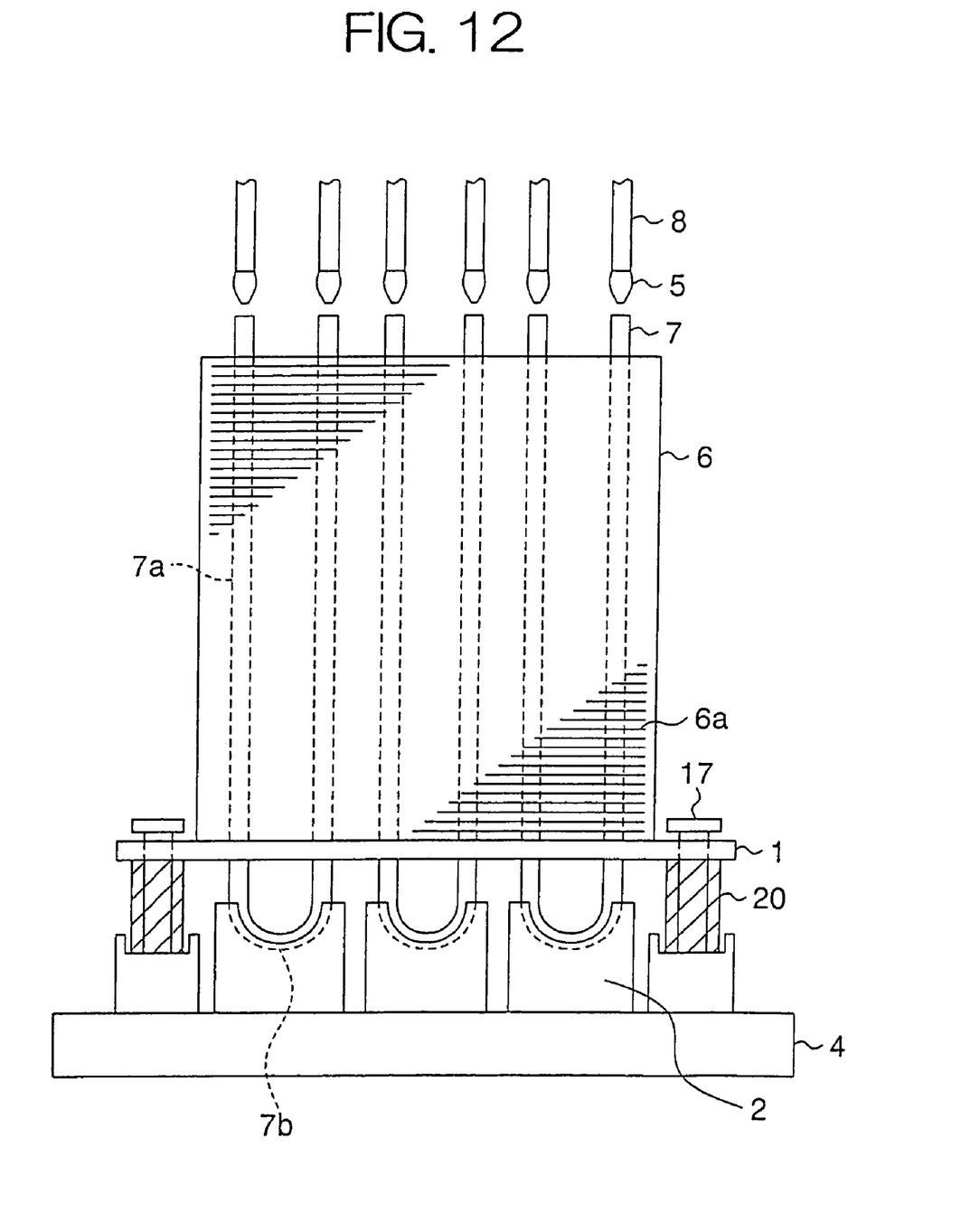
FIG. 12 is a front elevation showing part of a construction of a tube expanding apparatus according to Embodiment 4 of the present invention.

FIG. 12 is a front elevation showing part of a construction of a tube expanding apparatus according to Embodiment 4 of the present invention. In this embodiment, tubular resin members 20 are disposed as elastic bodies instead of the coil springs 18 of Embodiment 3. The tubular resin members 20 are prepared by foaming rubber, or urethane, etc., for example, and shaping it into a tubular shape, such that when a compressive load is applied the bubbles collapse, increasing the amount of deformation.

In a tube expanding apparatus having this kind of construction, because the raising and lowering means is constituted by tubular resin members 20 functioning as elastic bodies disposed between a fin receiver 1 and a receiver platform 4, the construction of the raising and lowering means for the fin receiver 1 can be further simplified, enabling it to be used as even less expensive equipment.

Embodiment 5

Figure 13:
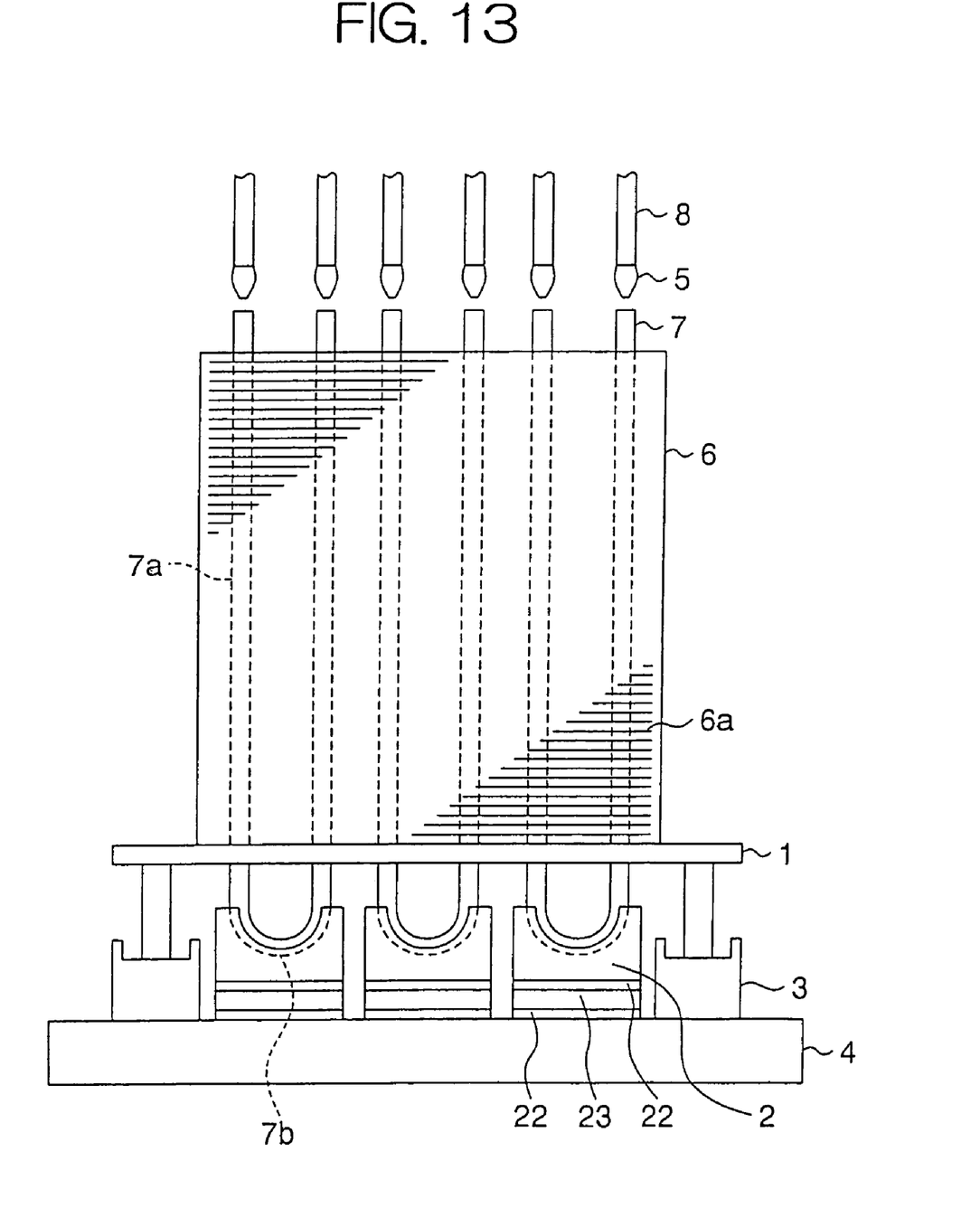
FIG. 13 is a front elevation showing part of a construction of a tube expanding apparatus according to Embodiment 5 of the present invention.

FIG. 13 is a front elevation showing part of a construction of a tube expanding apparatus according to Embodiment 5 of the present invention. In this embodiment, vibrators 23 functioning as a vibrating means held between two electrically-insulating plates 22 in a vertical direction are disposed between hairpin receivers 2 and a receiver platform 4. A voltage applying means (not shown) is electrically connected to the vibrators 23.

From the commencement to the completion of tube expansion, a voltage is applied to the vibrators 23 continuously or intermittently from a vertical direction, vibrating the hairpin receivers 2 in a vertical direction (a direction of lamination). Specifically, by generating vibrations having a frequency of 60 Hz, for example, in the vibrators 23 and transmitting them to hairpin tubes 7, surface frictional resistance between the hairpin tubes 7 and fin collars 6b is reduced.

Thus, when tube expansion is started and a fin receiver 1 is lowered, radiating fins 6a not yet subjected to tube expansion move smoothly downward without catching on the hairpin tubes 7. In addition, since frictional resistance between billets 5 and the hairpin tubes 7 is also reduced, good tube expansion performance can be achieved. It is also possible to transmit transverse vibrations (in a direction perpendicular to the direction of lamination) to the hairpin tubes 7 by setting the direction of the voltage applied to the vibrators 23 in a transverse direction.

In a tube expanding apparatus having this kind of construction, a vibrating means for vibrating the hairpin receivers 2 is further provided. Thus, because sliding resistance between outer circumferential surfaces of the hairpin tubes 7 and inner circumferential surfaces of the fin collars 6b can be reduced by transmitting minute vibrations to the hairpin tubes 7, enabling the radiating fins 6a to be moved smoothly downward, major deformation of the fin collars 6b and collapse of the radiating fins 6a due to concentration of local compressive loads can be prevented, thereby providing a heat exchanger 6 in which the radiating fins are maintained at a uniform distance.

Embodiment 6

Figure 14:
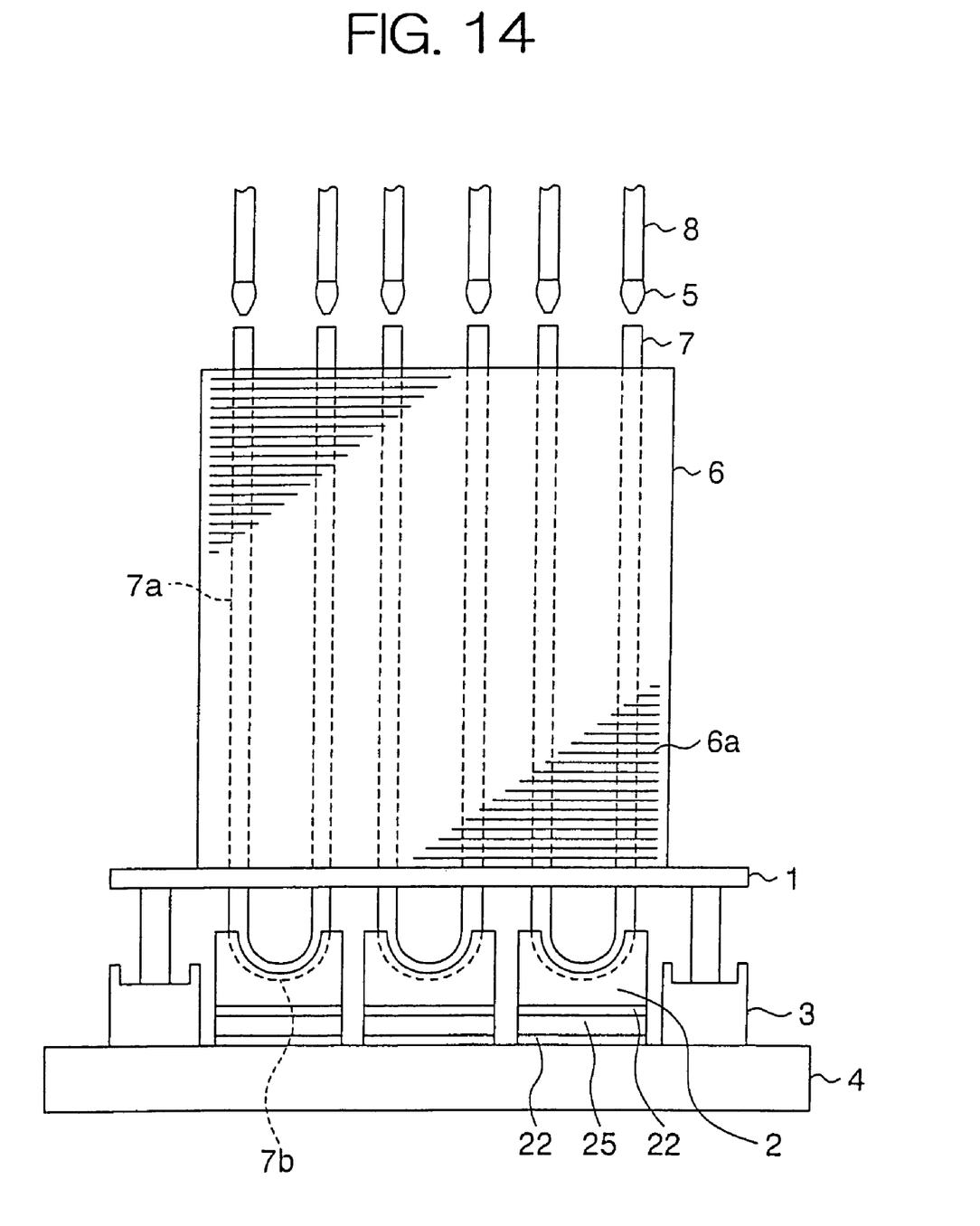
FIG. 14 is a front elevation showing part of a construction of a tube expanding apparatus according to Embodiment 6 of the present invention.

FIG. 14 is a front elevation showing part of a construction of a tube expanding apparatus according to Embodiment 6 of the present invention. In this embodiment, ultrasonic vibrators 25 are disposed as a vibrating means instead of the vibrators 23 of Embodiment 5.

From the commencement to the completion of tube expansion, a voltage is applied to the ultrasonic vibrators 25 continuously or intermittently from a vertical direction, minutely vibrating the hairpin receivers 2 in the vertical direction. Specifically, by generating vibrations having a frequency of 60 Hz, for example, in the ultrasonic vibrators 25 and transmitting them to the hairpin tubes 7, surface frictional resistance between the hairpin tubes 7 and the fin collars 6b is reduced to approximately one tenth (1/10).

By using a construction of this kind, when tube expansion is started and the fin receiver 1 is lowered, the radiating fins 6a not yet subjected to tube expansion move even more smoothly without catching on the hairpin tubes 7. In addition, since frictional resistance between the billets 5 and the hairpin tubes 7 is also further reduced, good tube expansion performance can be achieved. It is also possible to transmit minute transverse vibrations to the hairpin tubes 7 by setting the direction of the voltage applied to the ultrasonic vibrators 25 in a transverse direction.

When high-performance heat exchanger tubes are used, frictional resistance on the surface of the hairpin tubes 7 may increase because spiral grooves formed on inner surfaces may stand out on external surfaces, increasing surface roughness. In answer to this, in the present embodiment, surface frictional resistance between the hairpin tubes 7 and the fin collars 6b is further reduced by increasing the frequency of the vibrations, enabling the radiating fins 6a to be moved smoothly downward. Because of this, major deformation of the fin collars 6b and collapse of the radiating fins 6a due to concentration of local compressive loads is prevented, thereby providing a heat exchanger 6 in which the radiating fins are maintained at a uniform distance.

Moreover, in the above embodiments, a "vertical" tube expanding apparatus was used as the tube expanding apparatus 100 of the heat exchanger 6, but the tube expanding apparatus 100 is not necessarily limited to a vertical tube expanding apparatus and may also be a horizontal tube expanding apparatus, and it goes without saying that the present invention can be applied to any tube expanding apparatus provided that it is possible for tube expanding mandrels to be pressed inside first ends of hairpin tubes inserted through a large number of radiating fins constituting a heat exchanger, and the tube expanding apparatus has hairpin receivers for supporting curved portions at a curved portion end of the hairpin tubes; and a fin receiver for supporting a lower end portion of a plurality of laminated radiating fins.

What is claimed is:

1. A heat exchanger tube expanding apparatus for a heat exchanger having a plurality of laminated radiating fins with penetrating apertures on peripheral edge portions where fin collars are disposed upright and in which substantially U-shaped hairpin tubes are inserted through the penetrating apertures in a direction of lamination of the radiating fins, said tube expanding apparatus integrally securing the plurality of radiating fins by expanding straight portions of the hairpin tubes to place the hairpin tubes in pressure contact with the fin collars, said tube expanding apparatus comprising:

a receiver platform;
mandrels, each mandrel having a billet on a leading end;
a reciprocating actuator for supporting rear ends of said mandrels, said reciprocating actuator being supported to reciprocate in an axial direction of straight portions of the hairpin tubes;
a pressure drive source for raising and lowering said reciprocating actuator and expanding the straight portions of the hairpin tubes by pressing said billets into the straight portions of the hairpin tubes;
hairpin receivers for supporting curved portions of the hairpin tubes;
a fin receiver disposed at an end near the curved portions of the hairpin tubes for supporting an end portion of the plurality of laminated radiating fins; and
a passive elastic body disposed between said fin receiver and said receiver platform, wherein said passive elastic body lowers said fin receiver to a predetermined position as said mandrels descend and said billets begin to be inserted into the hairpin tubes.

2. The heat exchanger tube expanding apparatus according to claim 1, wherein said passive elastic body is a coil spring.

3. The heat exchanger tube expanding apparatus according to claim 1, wherein said passive elastic body is a foamed tubular resin body.

4. A heat exchanger tube expanding apparatus for a heat exchanger having a plurality of laminated radiating fins with penetrating apertures on peripheral edge portions where fin collars are disposed upright and in which substantially U-shaped hairpin tubes are inserted through the penetrating apertures in a direction of lamination of the radiating fins, said tube expanding apparatus integrally securing the plurality of radiating fins by expanding straight portions of the hairpin tubes to place the hairpin tubes in pressure contact with the fin collars, said tube expanding apparatus comprising:

a receiver platform;
mandrels, each mandrel having a billet on a leading end;
a reciprocating actuator for supporting rear ends of said mandrels, said reciprocating actuator being supported to reciprocate in an axial direction of straight portions of the hairpin tubes;
a pressure drive source for raising and lowering said reciprocating actuator and expanding the straight portions of the hairpin tubes by pressing said billets into the straight portions of the hairpin tubes;
hairpin receivers for supporting curved portions of the hairpin tubes;
a fin receiver disposed at an end near the curved portions of the hairpin tubes for supporting an end portion of the plurality of laminated radiating fins;
raising and lowering means for raising and lowering said fin receiver in the axial direction of the straight portions of the hairpin tubes, wherein said raising and lowering means lowers said fin receiver to a predetermined position as said mandrels descend and said billets begin to be inserted into the hairpin tubes; and
vibrating means for vibrating said hairpin receivers.

5. The heat exchanger tube expanding apparatus according to claim 4, wherein said vibrating means comprises an ultrasonic vibrator disposed between said hairpin receivers and said receiver platform.

* * * * *